Dec. 12, 1961  J. J. WEIER  3,012,824
TRACTION DEVICES
Filed June 28, 1960  2 Sheets-Sheet 1

INVENTOR.
Jacob J. Weier,
BY
Joseph B. Lindecker.
Attorney.

Dec. 12, 1961  J. J. WEIER  3,012,824
TRACTION DEVICES
Filed June 28, 1960  2 Sheets-Sheet 2

INVENTOR.
Jacob J. Weier
BY Joseph B. Lindecker
Attorney.

3,012,824
TRACTION DEVICES
Jacob J. Weier, 10611 S. Sawyer Ave., Chicago, Ill.
Filed June 28, 1960, Ser. No. 39,309
1 Claim. (Cl. 301—43)

The present invention relates to improvements in traction devices and, more particularly, to demountable wheels having metal rims with obliquely extending metal cleats, the metal cleats spaced parallel with each other and integrally formed upon the road surface portion of the metal rims, and having their free end portions extending a short distance beyond each side of the demountable wheels.

The main object of the invention resides in the provision of a demountable wheel of this character for use with motor vehicles, such as trucks, farm tractors or jeeps, which may be driven on soft or muddy ground.

Another object of this invention is to provide a traction device which comprises a metal disc wheel with an integral metal rim of semi-circular transverse cross-section, the rim curved circumferentially and provided on its outer periphery with parallel, spaced, oblique traction members integrally welded thereto with the free ends thereof extending outwardly beyond each side of the rim and wheel.

More specifically the object of this invention is to provide demountable steel wheels with stamped transverse semi-circular shaped metal road surface portions which can be used to supplant the ordinary disc wheels with pneumatic tires thereon, where supplementary traction is needed when a tractor type vehicle is used on soft or muddy ground.

According to the general features of this invention there is provided in a wheel structure including a metal wheel disc with transverse ribs welded about the periphery and normal thereof, a road surface portion being a stamping and welded to the ribs, the road surface portion being curved circumferentially and semi-circular in transverse cross-section, the entire structure being a rigid single unit and demountable on vehicle driving elements arranged upon the ends of the axles.

A still further object of this invention is to provide a traction device that is adapted to quantity production and inexpensive, and which will have longer life and usefulness than ordinary wheels with pneumatic tires thereon, by having the channel section stamped from sheet metal stock.

These and further objects of my invention will be set forth in the following specification, reference being had to the accompanying drawings, and the novel means to which said objects are effectuated will be definitely pointed out in the claim.

Figure 1:
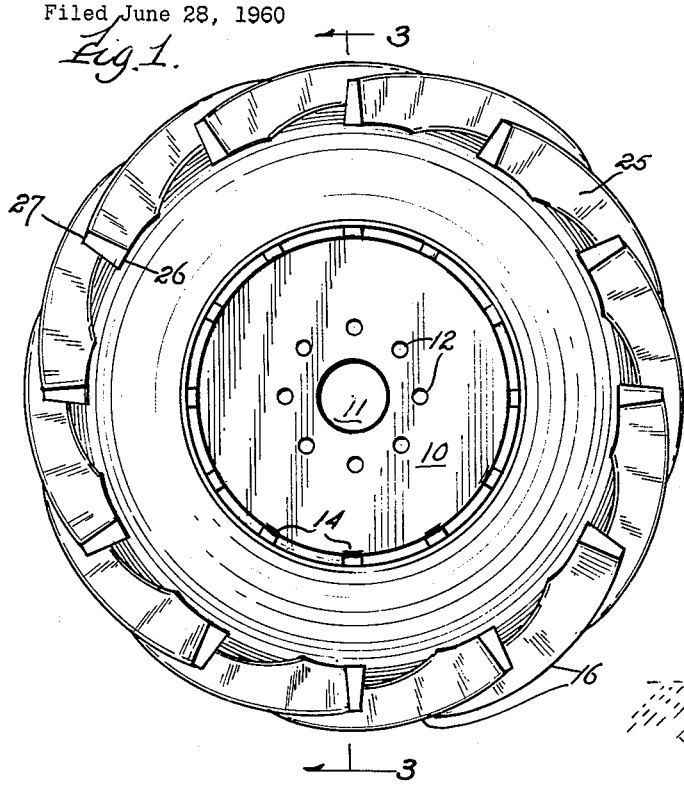
FIGURE 1 is a side elevational view showing a vehicle wheel with my improved traction device embodied therewith.

Off-the-highway vehicles of the usual type use large pneumatic tires for the two-fold purpose of carrying the load and providing a large supporting area for operation where ground supporting conditions are poor, such as in sand and mud. With the increasing use of greater power for driving such vehicles, it becomes necessary to increase the traction effect of such pneumatic tires in order to handle the load involved. These improved tires are very expensive and become useless after a period of time due to intervals of time throughout the year when they are not in use. Once the rubber cleats are worn off from the road surface of the tire, or when mud collects between the cleats on the tires, the tractive effort is lost and the vehicle equipped with the tires becomes mired in the sand or mud. In order to overcome the defects noted above by ordinary wheels with rubber tires, applicant has invented a novel one-piece metallic traction device, a demountable disc wheel is used, short transverse ribs are welded about the periphery of the disc wheel, a circular section which is semi-circular in cross-section is welded to the transverse ribs, the circular section having the appearance of and taking the place of a pneumatic tire on an ordinary wheel, and then metallic cleats are welded obliquely across the road surface portion of the circular section, the cleats being of sufficient length to extend radially outward from the circumference, and the side wall portions, of said circular section to gain supplementary gripping action with the ground when in contact, or embedded therewith. Most traction devices are difficult to apply upon or about a pneumatic tire on a vehicle wheel, especially the multiple section grouser type track. The improved traction device of this invention is less difficult to install; it takes only the usual simple procedure of elevating the vehicle from the ground with enough clearance whereby the highway wheel can be removed and the improved wheel embodying this invention can be applied with the greatest of ease.

The manner of accomplishing the foregoing objects, as well as further objects and advantages, will be made manifest in the following description.

The traction device of this invention comprises a disc wheel 10, with a central circular opening 11 and a plurality of bolt openings 12 equally spaced circumferentially and arranged a short distance outwardly from the central opening 11, the arrangement of the bolt openings 12 being such that the improved traction device can be mounted upon the standard bolts assembled with the standard driving hub members secured on the ends of the driving axles of the vehicle. A plurality of rectangular shaped ribs 14, as in the drawings twelve (12) ribs are shown, are welded intermediate their ends and normal to the disc wheel 10; the ribs being equally spaced from each other. A circular channel section 20, substantially semi-circular in cross-section is arranged upon the ribs 14 and welded to the end portions of said ribs 14. It is well known that a plurality of channel sections of substantially identical configuration could be assembled and welded to the ribs 14 and later welded to each other to make a solid traction device embodying a disc wheel, ribs, and a hollow channel section. The channel section 20, or sections 20, are usually made of two sheet metal sections formed by stamping processes and welded end to end. A plurality of cleats 16, usually made of iron, or the like, are integrally welded to the road surface portion of the channel section 20, thereby eliminating expensive machining processes usually required on cast and/or forged traction devices. The complete traction device is clearly shown by FIGURES 1 and 2, and the welded parts are clearly shown by the sectional view in FIG. 3. The channel section can be referred to as a hollow metallic casing of substantially U-shaped configuration in cross-section. The single channel section 20, or two or more sections welded together to form a single hollow section, is so shaped to supplement a pneumatic tire on a wheel, and forms an annulus member of great strength and durability.

One of the novel features of the invention resides in the provision of parallel, spaced, oblique metal cleats 16 integrally welded to the convex surface of the channel section 20. The cleats 16 extend diagonally across the channel section 20 and have their end portions 21 and 22 extending a short distance beyond each side of the channel section, the ends 21 and 22 of the cleats 16 being in substantially longitudinal alignment with corresponding ends on the same side of the disc wheel 10. As shown by FIGURE 1 of the drawings, the channel section 20 comprises twelve diagonal, parallel, spaced metal cleats 16. The cleats are characterized by being of concavo-convex curvature longitudinally, the radius of said longitudinal curvature being constant. The cleats 16 are trapezoidal, or wedge-shaped in vertical section, constructed of hard metal such as special iron, or steel, the side walls 25 are tapered outwardly toward the base, thereby providing a thicker base surface 26 than the top surface 27 thereof. The cleats 16 are each a continuous, unbroken blade extending beyond each side of the channel section at approximately forty-five (45°) degrees relative to the longitudinal axis of the channel section. The far end 22 of each cleat 16 terminating at one side of the channel section is in transverse alignment with the near end 21 of the second following cleat 16, whereby a smooth substantially continuous twin road contacting surface is provided as the weight of the load is transferred from two adjacent cleats to the next two adjacent cleats as the wheel turns. The cleats 16 are free of any longitudinal flanges whereby the cleats actually cut into the ground, not pressed all at one instant, and the ground, or soil, actually passes transversely between the cleats. No dirt ever clings to the channel section 20 between the cleats 16, as is clearly shown by FIGURE 2. The metal area upon the convex exterior surface between the cleats of each section is a closed, smooth surface, and being of stamped smooth sheet metal with a polished surface, no mud ever clings thereto. It is clearly seen that the cleats are metal blades diagonally arranged, transversely curved with their base portions welded to the convex surface of the channel section 20, the interior surface of the channel section 20 being concave forming a hollow annulus type member with smooth interior surface, partially closed along its internal periphery by the transverse ribs welded at their ends to the opposite free peripheral edges thereof, as clearly shown by FIG. 3.

Figure 2:
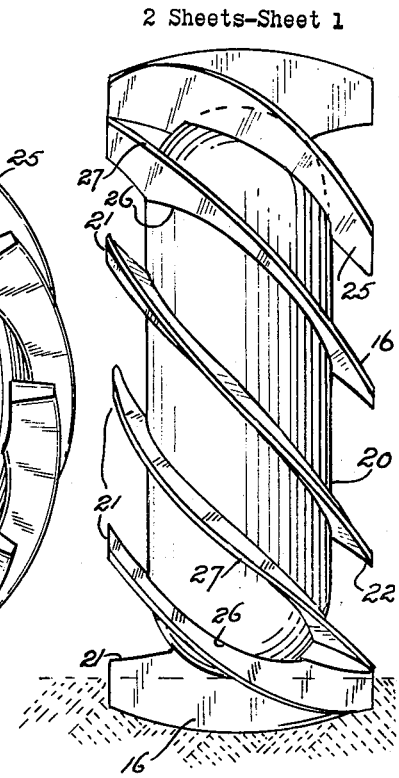
FIGURE 2 is a vertical front elevational view of the improved traction device shown by FIG. 1 with the entire unit under load and showing a cleat thereof embedded in the soil.
Figure 3:
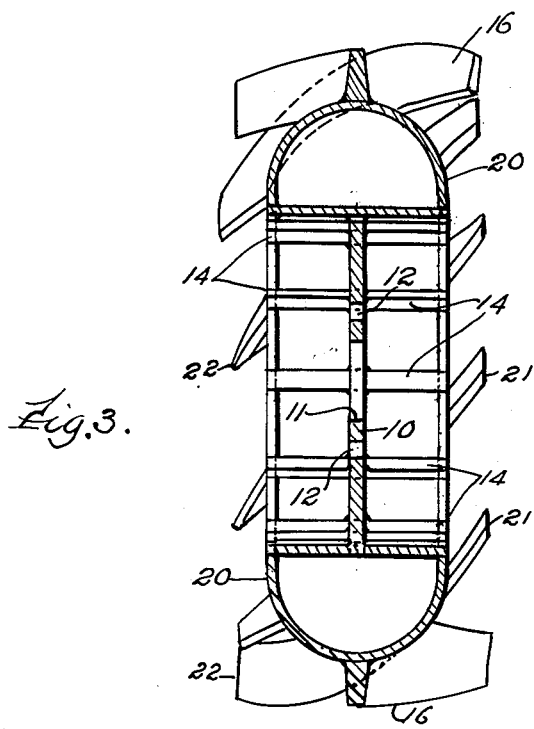
FIGURE 3 is a transverse sectional view taken along line 3—3 of FIG. 1.

The novel traction device shown by FIGURES 1, 2 and 3, shows the wheel demountable by applying it over the ordinary bolts extending from the hub-cap member attached on the ends of the drive axles.

Figure 4:
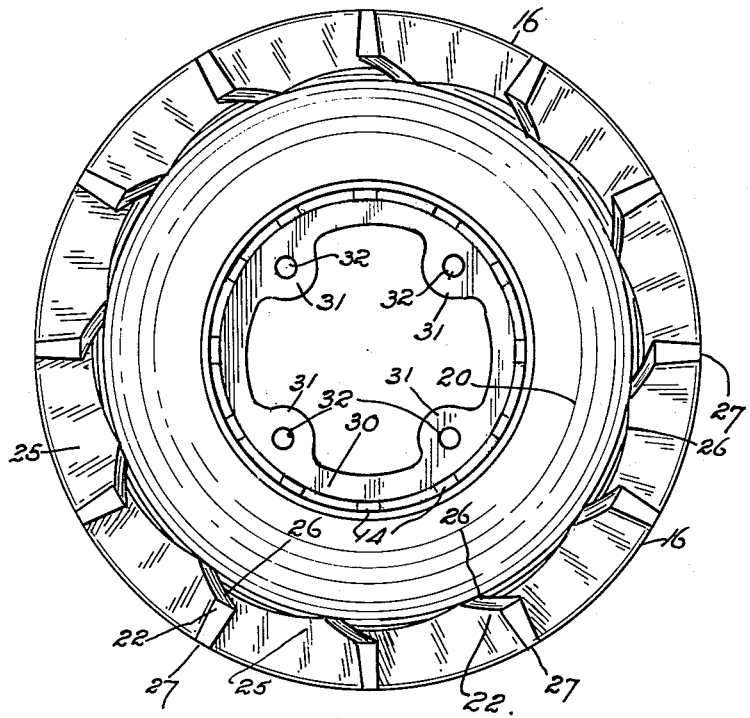
FIGURE 4 is a side elevational view showing my improved traction device embodied with a modified type of ring supporting means with four lobes and one bolt hole in each one thereof.

The modification shown by FIGURE 4 is substantially the same structure except a vertical ring 30 is substituted for the disc wheel 10 shown by FIGURES 1, 2 and 3. It is customary with some types of tractors to remove a tire, the tire rim and adjacent ring section from the driving hub cap and extension ring simply by removal of the four standard bolts, arranged about the wheel and spaced ninety (90°) degrees apart. It is quicker because the removal of four (4) bolts instead of the usual eight (8) bolts used with the disc wheel. For road surface driving with this type vehicle the four bolts are removed, the ring, ribs, channel member and cleats are removed as a unit and a ring, tire rim and tire substituted for the same. The procedure is reversed when the vehicle is used in sand, mud or snow.

The traction unit shown by FIG. 4 is constructed in the same manner as described above, except a ring 30, provided with four lobes 31, each lobe having a bolt hole 32 therein. The outer circumferential edge portion is welded to the mid-section of twelve cross ribs, equally spaced about the periphery thereof. Two or more sub-channel sections are formed by stamping process from sheet metal giving sections a uniform thickness and smooth interior and exterior surfaces. The sections are then welded to the ribs and to each other to form a single unit. Metal cleats 16 are welded to the exterior surface of each section at any desired time, before or after welding of the sections to the ends of the cross ribs 14.

The smooth exterior surface of the stamped channel sections substantially prevents mud from clinging thereto. However, in some instances the operator can apply wax, or the like, to the ground contacting surface of the convex surface of the channel sections.

In the manufacture of my improved traction device the sub-channel sections 20 are separately formed from individual blanks of predetermined size and shape in a plurality of stamping operations. The preformed metal cleats are welded to the channel sections while they are held in the proper position by a suitable fixture. The ring, or wheel disc, and cross ribs can be arranged in a suitable fixture and then welded together. The channel sections can then be assembled and welded to the cross ribs, already secured to the ring or wheel disc, thereby producing a strong compact unit.

The cleats and various parts can also be secured to the channel sections by a brazing process instead of the welding process.

From the preceding description, it will be noted that the annular channel section is made up of a plurality of my improved channel sections, each composed of a stamping, stamped or pressed from a sheet metal blank. In this stamping a pressing process of the fibers of the sheet metal are preserved, thus producing a channel section which preserves the strength of the sheet metal. The channel shape of each sub-section provides maximum strength and gives a light weight hollow concave channel section. From the above description it is evident that my improved traction device is a strong demountable wheel type unit, and lighter in weight than cast metal castings with heavy tires and tire rims mounted thereon. This method of producing the channel sections has been described in my co-pending patent application, Ser. No. 859,435, filed December 14, 1959, now Patent No. 2,966,932.

While I have described one form of my invention, I do not wish to be limited to the particular form shown and described, as it is apparent to those skilled in the art that many modifications therein may be made without departing from the scope of the invention.

What I claim is:

A device for improving traction of a motor vehicle, said traction device comprising a demountable wheel, said demountable wheel comprising a disc wheel member, a plurality of cross ribs equally spaced about the peripheral edge of said disc wheel member and welded thereto midway between the ends thereof, an annular channel section, said annular channel section composed of a plurality of substantially identical circular imperforated rigid sheet metal sub-channel sections welded together at the distal ends thereof, said sub-channel sections being substantially semi-circular in cross-section and of a fixed transverse diameter, said cross ribs being substantially the same in length as the fixed transverse diameter of said sub-channel sections, the peripheral edge portion of said sub-channel sections welded to the opposite ends of said crossribs whereby said disc wheel member, the cross ribs and the annular section become one rigid unit, said annular channel section having a plurality of substantially straight, diagonal, parallel, spaced metal cleats of trapezoidal vertical cross section welded to its circumferential external surface, said cleats being of concavo-convex curvature longitudinally, the longitudinal length of said cleats being greater than the transverse width of said annular channel section, and said cleats extending outwardly beyond each side of said annular channel section.

References Cited in the file of this patent

UNITED STATES PATENTS

| | | |
|---|---|---|
| 732,623 | Elison | June 30, 1903 |
| 1,363,519 | Lachman | Dec. 28, 1920 |
| 1,410,255 | Jacob | Mar. 21, 1922 |
| 1,491,667 | Brandt et al. | Apr. 22, 1924 |
| 1,559,478 | Leverenz | Sept. 14, 1926 |
| 2,106,135 | Henry | Jan. 18, 1938 |
| 2,316,502 | Carman | Apr. 13, 1943 |

FOREIGN PATENTS

| | | |
|---|---|---|
| 462,363 | France | Nov. 20, 1913 |
| 17,106 | Australia | 1928 |
| 820,671 | France | Aug. 2, 1937 |